United States Patent [19]

Somasundaran et al.

[11] Patent Number: 5,705,222

[45] Date of Patent: Jan. 6, 1998

[54] PROCESS FOR PREPARING NANOCOMPOSITE PARTICLES

[75] Inventors: Ponisseril Somasundaran, Nyack; Tsung-Yuan Chen, Astoria, both of N.Y.

[73] Assignee: The Trustees of Columbia University in the City of New York, New York, N.Y.

[21] Appl. No.: 562,972

[22] Filed: Nov. 27, 1995

[51] Int. Cl.⁶ ........................................................ B05D 7/00
[52] U.S. Cl. ........................................ 427/320; 427/221
[58] Field of Search ................................. 427/212, 220, 427/221

[56] References Cited

U.S. PATENT DOCUMENTS

| | | | |
|---|---|---|---|
| 4,395,485 | 7/1983 | Kashiwagi et al. | 427/221 |
| 5,102,592 | 4/1992 | McCauley et al. | 427/220 |
| 5,194,263 | 3/1993 | Chamberlain et al. | 504/347 |

FOREIGN PATENT DOCUMENTS 572182  1/1993  European Pat. Off. .

OTHER PUBLICATIONS

Malghan et al., Composite Interfaces, 1:193–210 (1993).

*Primary Examiner*—Shrive Beck
*Assistant Examiner*—Bret Chen
*Attorney, Agent, or Firm*—Brumbaugh, Graves, Donohue & Raymond

[57] ABSTRACT

This invention relates generally to a process for preparing composite particles. More specifically, this invention relates to a process for preparing polymer-coated composite particle dispersions wherein excess polymer is removed by a controlled washing step. This invention further relates to a process for preparing composite particles wherein the particles have an inner core particle coated with at least one polymer coating and at least one shell particle coating.

17 Claims, 6 Drawing Sheets

PROCESS FOR PREPARING NANOCOMPOSITE PARTICLES

INTRODUCTION

This invention relates generally to a process for preparing nanocomposite particles. More specifically, this invention relates to a process for preparing polymer-coated nanocomposite particle dispersions wherein excess polymer is removed by a controlled washing step. This invention further relates to a process for preparing nanocomposite particles wherein the particles have an inner core particle coated with at least one polymer coating and at least one shell particle coating.

BACKGROUND OF THE INVENTION

Conventional methods for producing polymer coated particles are problematic because they produce heterogenous mixtures of polymer-coated particles and excess polymer. It is not desirable to use these solutions to create polymer-coated particles having an outer coating of nanosized particles because the excess polymer left in solution after applying the polymer coating will cause irreversible self-flocculation of the shell particles.

Several unsuccessful attempts have been made to overcome these problems. For example, European Published Patent Application 0 572 128 suggests using a starvation polymerization reaction to ameliorate the homogeneity problem by polymerizing a monomer in situ on a core particle surface. This process is disadvantageous because the monomer must be added slowly, and it is more difficult to precisely control the properties of a polymer formed in this manner.

Therefore, a need clearly exists for a successful method of preparing nanocomposite particles comprising core particles having a bridging polymer coating bonded to a layer of sized shell particles.

SUMMARY OF THE INVENTION

The deficiencies of the prior art are substantially ameliorated in accordance with the present invention, which is in one aspect, a process for preparing nanocomposite particles. In this process, a core-particle powder is first dispersed in an aqueous solution. A polymer which has an electrostatic or chemical affinity for the core particles is then added to the dispersion, thus forming polymer-coated particles. Excess polymer which is not adsorbed on the particles is subsequently removed by a washing step which comprises centrifuging the dispersion, extracting the supernatant liquid, re-dispersing the core particles in aqueous solution, and repeating this washing step as necessary until the polymer concentration in the supernatant liquid falls below 1 part per million (hereinafter "ppm").

In a preferred embodiment of the present invention, after the washing step, a dispersion of shell particles is added to the dispersion of polymer-coated core particles. Excess shell particles are then removed by a second washing step, which comprises centrifuging the dispersion, extracting the supernatant liquid, re-dispersing the composite particles in aqueous solution, and repeating this washing step as necessary.

In a further preferred embodiment of the present invention, multiple layers of polymer coatings and shell particle coatings may be applied to the core particle.

In another aspect of the present invention, there is provided a nanocomposite particle dispersion prepared by the above-described process.

Other features, aspects and advantages of the invention will become better understood with reference to the following description of the invention, the claims, and accompanying drawings.

DETAILED DESCRIPTION OF THE PREFERRED EMBODIMENTS

Figure 1:
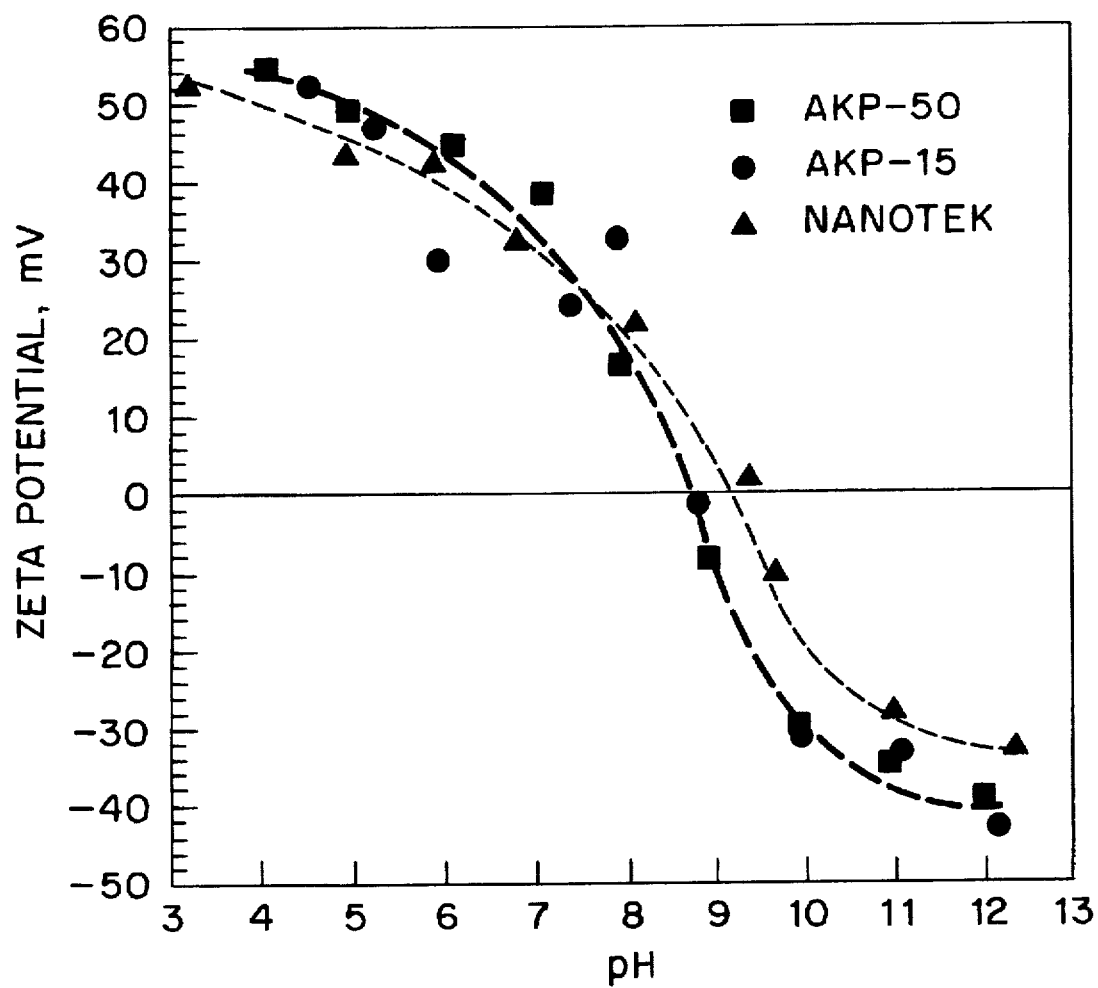
FIG. 1 is an overlay plot of Zeta potential (mV) versus pH for various types of alumina ($Al_2O_3$) particles in an aqueous 0.03M NaCl solution.
Figure 2:
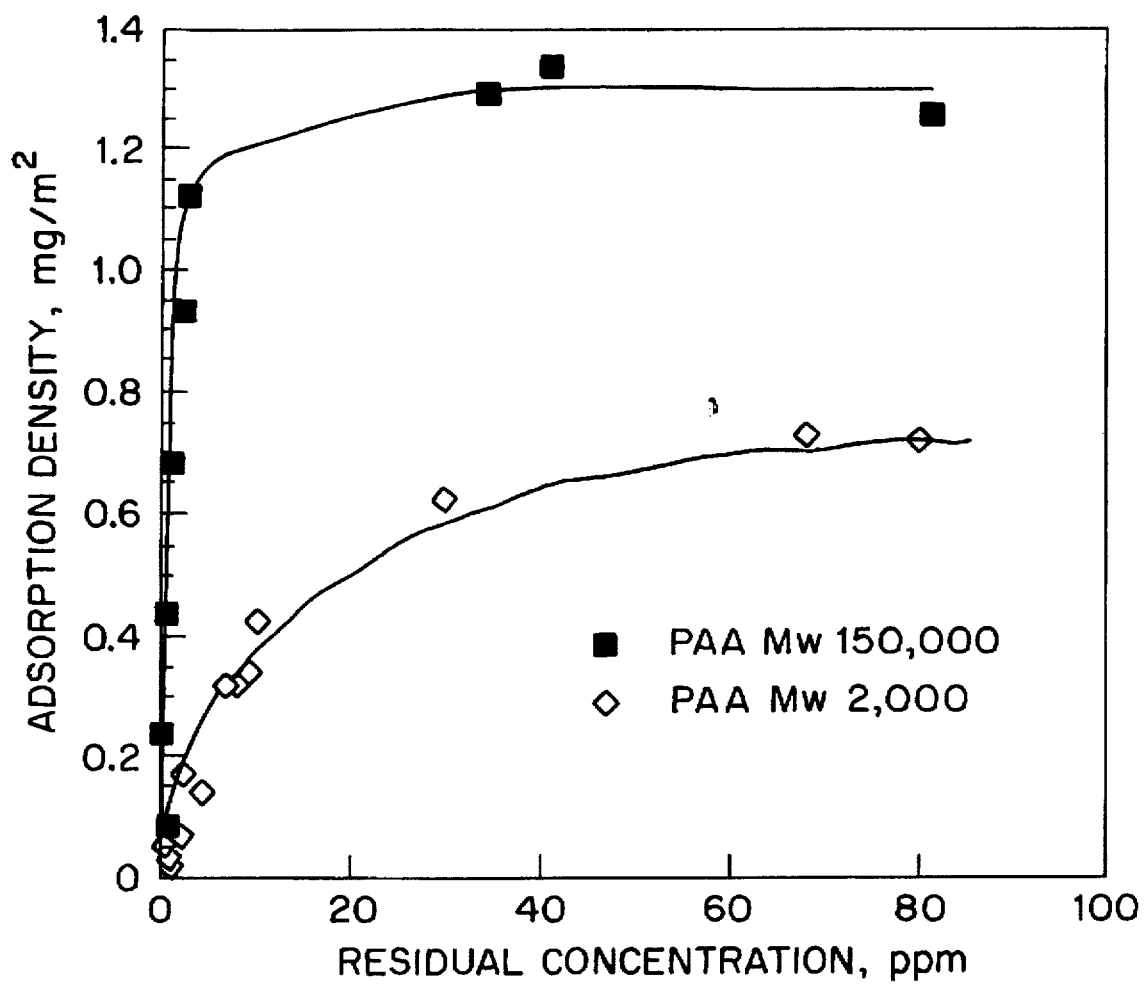
FIG. 2 is an overlay plot of adsorption density ($mg/m^2$) of polyacrylic acid (hereinafter "PAA") on alumina particles versus residual concentration (ppm) of PAA in the supernatant liquid.

The present invention provides a process for preparing a dispersion of composite particles having core particles with polymer coatings and optional further coatings of shell particles.

The invention is based, in part, on the finding that core particles can be coated with a polymer, and any excess polymer can later be removed by a controlled washing step. The controlled washing step consists of centrifuging the core particle dispersion to segregate the polymer-coated particles from the supernatant liquid, extracting the supernatant liquid, and re-dispersing the polymer-coated particles in fresh solution. This process may be repeated as necessary until the polymer concentration in the supernatant is reduced to preferably less than 1 ppm. Dispersions of polymer-coated particles formed by this method are advantageous because they are homogeneous and free from excess polymer which promotes irreversible self-flocculation of nano-sized shell particles. These dispersions also have superior physical properties which result from their homogeneous structure.

Preferable core particles according to the invention are inorganic materials having a diameter between 0.1 and 100 µm. In a more preferred embodiment, the core particles have a diameter between 0.1 and 1.0 µm. Core particles according to the invention are comprised of materials having surface characteristics that enable strong, irreversible polymer adsorption. Preferable materials include metal oxides, metal carbides and metal nitrides. Most preferable core particle materials include alumina ($Al_2O_3$) and silicon nitride ($Si_3N_4$).

As shown in Example 1, the core particle dispersions are preferably formed by mixing the core particles in an aqueous solution. However, nonaqueous solutions may also be used for preparing these dispersions. This aqueous solution may contain a salt, however this is not necessary. Any salt is acceptable so long as it does not react with the core particle surface or the polymer. Preferable salts for use in the solution are NaCl and $NH_4NO_3$. If a salt is used, it is desirable to use low concentrations of the salt to avoid substantial contamination of the nanocomposite particles. Therefore, salt concentrations preferably remain below 0.1M.

The pH of the aqueous solution may be adjusted before adding the core particles to form a dispersion. This is important if the core particles have a tendency to self-flocculate at the pH of the aqueous solution. It is also possible to adjust the pH after dispersing the core particles.

In one embodiment of the invention, the pH must be adjusted to a value where the core particles exhibit a Zeta potential that is opposite to the charge of the polymer so that the polymer will be adsorbed onto the core particle surface. The Zeta potential must also be at least +/–20 mV such that sufficient electrostatic repulsion exists between core particles to prevent flocculation. As shown in Example 1, the pH is adjusted by adding a common acid or base (e.g., hydrochloric acid, nitric acid or ammonium hydroxide).

In another embodiment of the invention, the Zeta potential must also be at least +/–20 mV such that sufficient electrostatic repulsion exists between core particles to prevent flocculation. However, the pH need not necessarily be adjusted because the polymer chemically binds to the core particle.

As noted above, it is not necessary to include any salt in the aqueous solution. The salt is, however, necessary for keeping ionic strength constant to allow easy interpretation of the Zeta potential measurements used to determine the optimum pH of the aqueous solution.

It is preferable for the mixture of core particles and the aqueous solution to be ultrasonicated and stirred to form a dispersion.

After forming the core particle dispersion, an aqueous polymer solution is added which contains a polymer preferably having a charge opposite to the Zeta potential of the dispersed core particles or a chemical affinity for the core particle. Preferable polymers include polyacrylic acid, polymethacrylic acid, polyvinyl alcohol, polyamides and polypeptides. A more preferable polymer according to the present invention is polyacrylic acid.

It is important that the molecular weight of the polymer be low enough such that it does not cause irreversible flocculation of the shell particles. It was found that polyacrylic acid having a molecular weight of 150,000 did not cause irreversible flocculation, but that polyacrylic acid having a molecular weight of 1,000,000 did cause irreversible flocculation.

After adding the polymer solution, the resultant dispersion of polymer and core particles is preferably equilibrated over a period long enough to obtain sufficient coverage of the polymer. This time period may vary from less than a minute to several hours.

Excess polymer is then removed from the solution by a washing step. This washing step may be any solid/liquid separation technique. Preferable techniques include centrifuging, filtration or ultrafiltration. A most preferable technique is described as follows. First, the solution is centrifuged to yield a sediment of polymer-coated particles and a polymer-containing supernatant liquid. The supernatant liquid is then extracted, and fresh solution optionally containing a salt is added. The polymer-coated particles are then re-dispersed by mixing and ultrasonic agitation.

Figure 3:
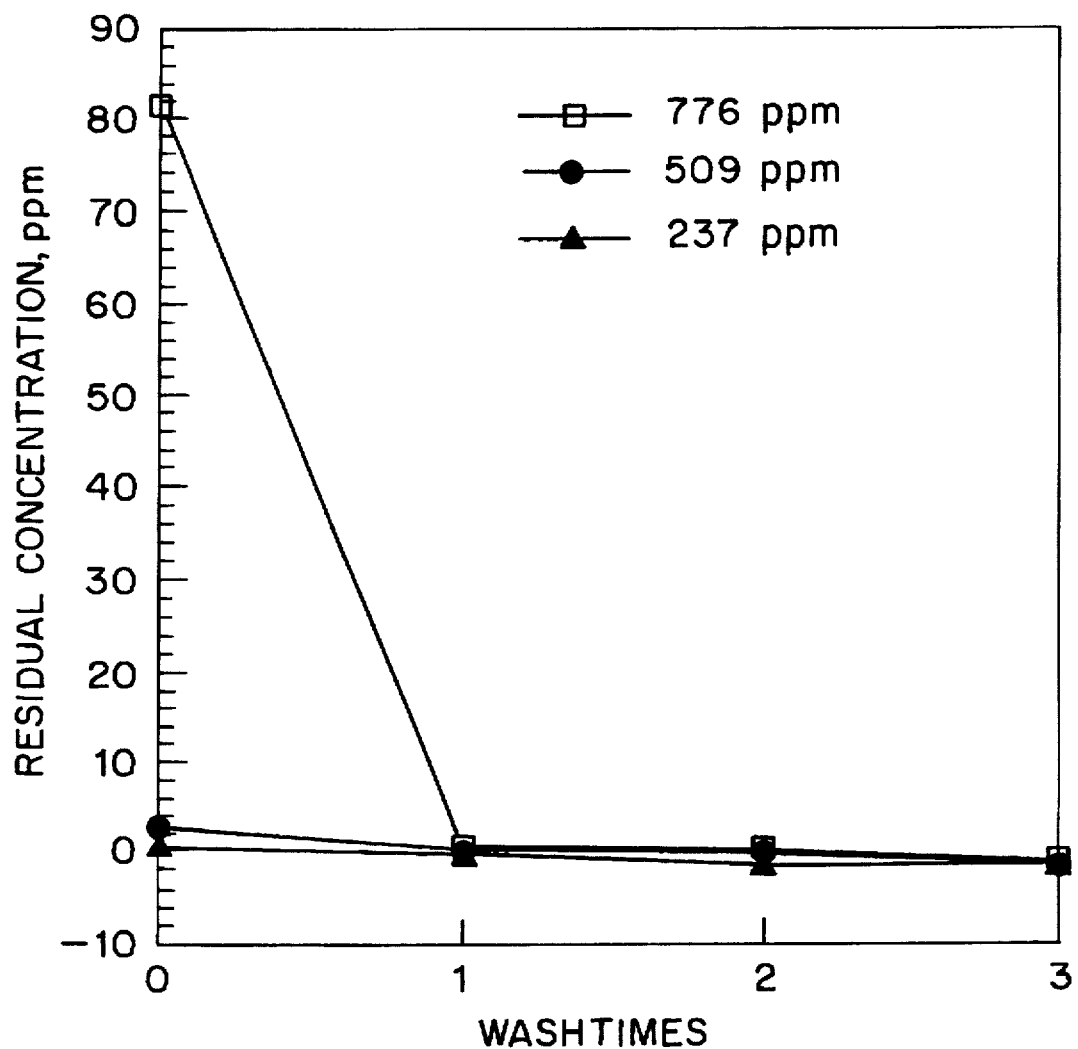
FIG. 3 is an overlay plot of residual polymer concentration (ppm) versus washtimes for various PAA concentrations added to an alumina core particle suspension.

This washing process may be repeated if high levels of excess polymer remain in the supernatant liquid. As shown in FIG. 3, if less than a saturation amount of polymer (237 ppm or 509 ppm) is added to the solution, substantially all the polymer will be adsorbed on the core particles, and additional washing will therefore be unnecessary. However, if more than the saturation concentration of polymer is added (776 ppm), additional washing steps may be necessary.

Nanocomposite particles with a "core particle/polymer layer/shell particles" sandwich structure may be formed by adding a dispersion of shell particles to polymer-coated core particle dispersions formed according to the above-described process. The shell particles need not have the same composition as the core particles. However, preferable materials for the shell particles are materials which have an affinity for the polymer coating. Some preferable shell particle materials include metal oxides, metal nitrides and metal carbides. The shell particles preferably have a diameter between 1 and 100 nm. The shell particles are dispersed by mechanical agitation. Preferable types of mechanical agitation include mixing and ultrasonication.

After mixing together the shell particle dispersion and the polymer-coated core particle dispersion, excess shell particles may be removed via a solid/solid separation technique such as the above-described centrifuging/redillution washing procedure or by fine sieving or elutriation.

The addition of polymer and shell particle suspensions may be repeated as necessary to produce particles having several layers of polymer and shell particle coatings. Such multilayer nanocomposite particles may be tailored for particular applications by selecting particular materials.

Zeta potentials of powders used in the present application were measured by an electrophoretic technique using a LASER ZEE® meter (Pen Kem).

Surface areas of the powders used were measured by the nitrogen-adsorption BET method using a QUANTASORB® instrument.

The amount of polymer in the supernatant liquid was determined by total organic carbon analysis measurement, obtained using a BROOKMAN DC-90® instrument.

The nanocomposite particle dispersions obtained by the method of the present invention are superior because they do not have excess polymer and because they do not self-flocculate. Moreover, the method is advantageous because it works well with a variety of different materials.

The nanocomposite particles produced according to the above-identified method may be used for a variety of purposes. The nanocomposite particles are particularly suited for use as precursors for making advanced ceramic compositions. The nanocomposite particles of the present invention are advantageous for such applications because they provide an opportunity to coat the core particles with more exotic materials which may strengthen grain boundaries in a ceramic formed from the nanocomposite particles. Such ceramics may be useful as film coatings or as construction materials for various applications, including applications which demand light-weight materials which are durable at high temperatures.

It should be noted that the invention is not limited to coating micron-sized particles with nanosized particles. Larger or smaller core and shell particles may also be used for forming particles according to the present invention.

The present invention is further described by way of the following examples. These examples are intended to be representative of the invention and are not in any way intended to limit its scope.

EXAMPLE 1

Coating of Alumina Particles with PAA

Two types of alumina ($Al_2O_3$) powders (AKP-15®, diameter=0.7 μm and AKP-50®, diameter=0.2 μm) were purchased from the Sumitomo Chemical Co. for use as core particles. These powders are both α-alumina and have a purity of greater than 99.9 percent. Polyacrylic acid of molecular weights 2,000 and 150,000 was purchased from the Aldrich Chemical Company and the Polysciences Co., respectively. American Chemical Society reagent grade sodium chloride (NaCl) and ammonium nitrate ($NH4NO_3$) was purchased from Fisher Scientific Co. Standard solutions of hydrochloric acid, sodium hydroxide, nitric acid and ammonium hydroxide were purchased from Fisher Scientific Co. Triply distilled water with a conductivity of $10^{-6}$ mhos was used for preparing all solutions.

PAA-coated alumina particle dispersions were prepared by the following procedure. First, 0.5 grams of AKP-15® and AKP-50® were separately added to 5 ml aliquots of a 0.03M NaCl aqueous solution. These mixtures were then ultrasonicated using 40 watts of power for 1 minute to form two suspensions. FIG. 1 shows a plot of Zeta potential versus pH for these suspensions. The pH was then adjusted to 4 by adding hydrochloric acid to both of these suspensions. The suspensions were then stirred for 3 hours.

PAA solutions containing various concentrations of PAA (MW=150,000 and MW=2,000) were then dissolved in 0.03M NaCl aqueous solution. In each case, the PAA solution pH was adjusted to 4, and then 5 ml of the PAA solution was added to the core particle suspension. The mixture of PAA and core particles was then equilibrated for approximately 15 hours.

After equilibration, the polymer-coated core particles were washed by the following procedure. First, the mixture of PAA and polymer-coated core particles was centrifuged, thereby forming a polymer-coated core particle sediment and an excess polymer containing supernatant liquid. Second, the supernatant liquid was removed and an equivalent of fresh (polymer free) 0.03M NaCl aqueous solution of pH=4 was added. Third, this mixture was re-dispersed by ultrasonication (1 minute) and mixing (30 minutes). This washing procedure was repeated as necessary until the supernatant liquid produced after centrifuging contained less than 1 ppm PAA.

Figure 4:
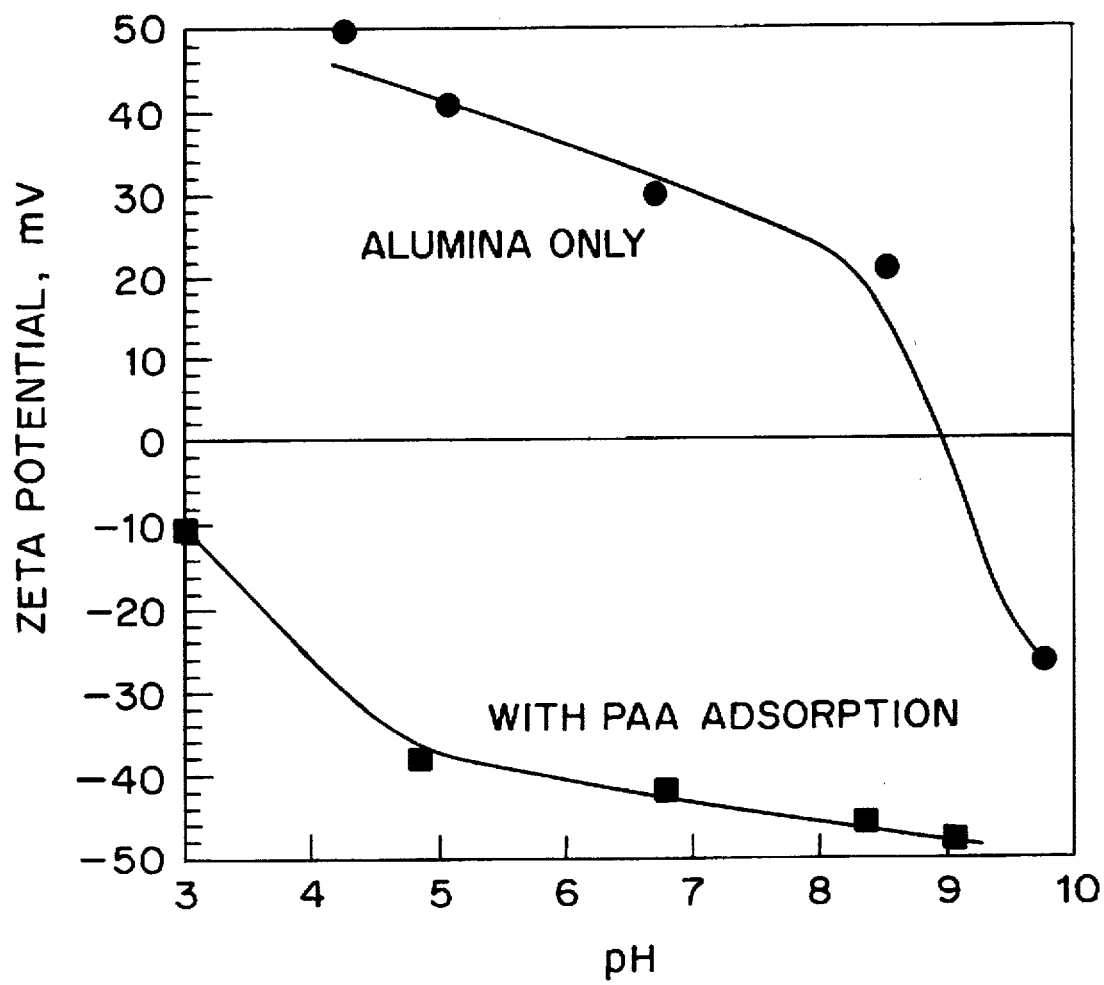
FIG. 4 is an overlay plot of Zeta potential (mV) versus pH for alumina core particles with and without a PAA coating.

FIG. 3 shows that when the concentration of PAA (MW=150,000) added to AKP-50® is 509 ppm or 237 ppm, the concentration of PAA in the supernatant is below 5 ppm after the first washing step. However, when the concentration of PAA added is 776 ppm, one additional washing step is necessary to produce a supernatant solution containing less than 5 ppm. This result indicates that 227 ppm and 509 ppm are below the alumina surface saturation concentration, whereas 776 ppm is above the alumina surface saturation concentration. It was found that it was typically necessary to repeat the washing step three times to ensure the residual polymer concentration was lower than 1 ppm. This was sufficient to eliminate any deleterious effects due to excess polymer. FIG. 4 shows that PAA (MW=150,000) adsorbed on AKP-50® reverses the charge of the particles at pH<9.

EXAMPLE 2

Coating of Alumina Core Particles with PAA And A Layer of Alumina Shell Particles NANOTEK® alumina particles consisting of γ-alumina with a mean particle size of 36 nanometers were obtained from Nanophase Technologies Co.

A suspension of NANOTEK® alumina shell particles was prepared by dispersing the particles in a 0.03M NaCl solution (pH adjusted to 4) using ultrasonication and mixing. FIG. 1 shows that the Zeta potential of the NANOTEK® particles is approximately 50 mV at a pH of 4. The shell particle suspension had a weight ratio of 5 percent solid/liquid. The shell particle suspension was stirred into the AKP-15® suspension (with PAA MW=150,000) produced according to Example 1. Excess nanoparticles were then extracted by centrifuging, removing the supernatant liquid, and redispersing with fresh (particle free) solution in a manner analogous to the washing step for removal of excess polymer as described in example 1.

Figure 5:
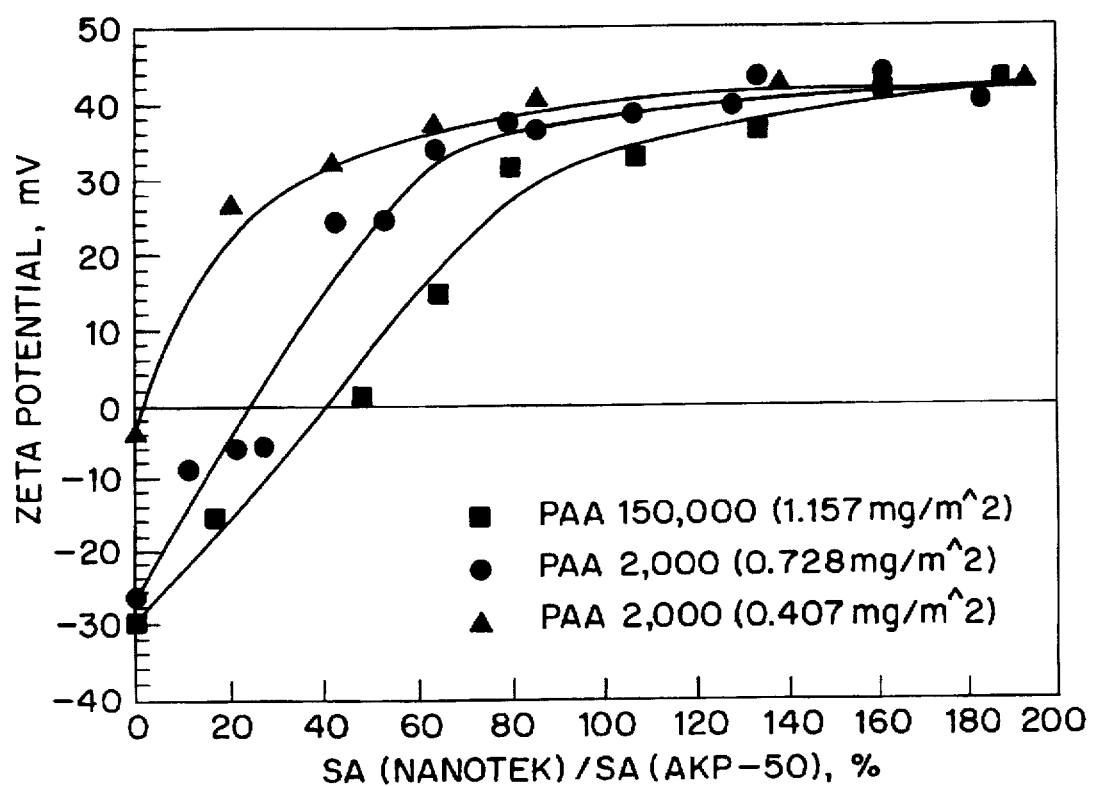
FIG. 5 is an overlay plot of Zeta potential (mV) versus the ratio of the surface area of shell particles to core particles for various molecular weights and coverages of PAA.
Figure 6:
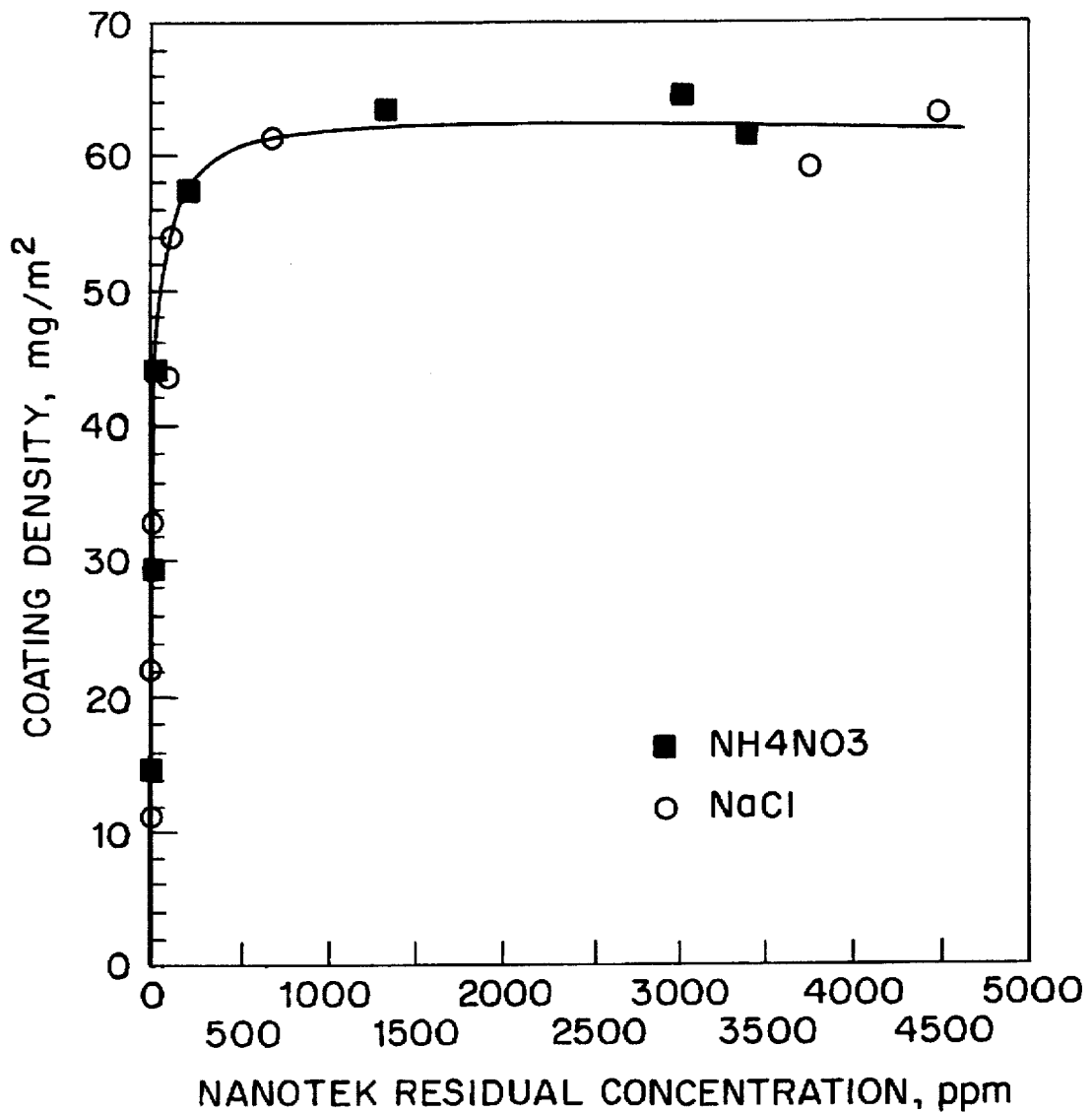
FIG. 6 is an overlay plot of shell particle coating density ($mg/m^2$) versus residual shell particle concentration (ppm) for solutions containing NaCl and solutions containing $NH_4NO_3$.

This process was similarly performed using PAA with a molecular weight of 2,000. Two nanocomposite particle dispersions (PAA MW=2,000 and PAA MW=150,000) having the "core particle/PAA/shell particles" structure were prepared by this procedure wherein a monolayer of shell particles was adsorbed to the polymer bridging layer. FIG. 5 shows the Zeta potential of nanocomposite particles prepared according to this example having varying coverages of shell particles. FIG. 6 shows that the salt used in preparing shell particle dispersions did not affect the coating density of the nanocomposite particles.

EXAMPLE 3

Coating of Silicon Nitride Core Particles with PAA And A Layer of Alumina Shell Particles SN E-3® silicon nitride powder having a mean particle size of 1.1 μm was obtained from UBE Chemical Co.

Nanocomposite particles having the "core particle/PAA/shell particles" structure were prepared by the same procedure as in Example 2 except that the SN E-3® silicon nitride powder was substituted for the alumina core particles. PAA of molecular weight 150,000 was used as the bridging polymer.

EXAMPLE 4

Coating of Alumina Core Particles with PAA And A Layer of Titania Shell Particles Both AKP-15® and AA07® (particle size=0.9 μm, purity>99.9%) alumina particles were used as core particles. NANOTEK® titania powder (particle size=34 nm, 80 percent anatase phase and 20 percent rutile phase) obtained from Nanophase Technologies Co. was used as shell particles. PAA (MW=150,000) obtained from Polysciences Co. was used as the polymer bridging agent.

Nanocomposite particles having the "core particle/PAA/shell particles" structure were prepared by the same procedure as described in Example 2. The nanocomposite particles prepared by this method had one layer of titania shell particles.

We claim:

1. A process for preparing composite particle dispersions consisting essentially of:

dispersing a plurality of core particles in a first solution wherein the core particles do not irreversibly self-flocculate, adding an amount of a polymer to the dispersion of core particles wherein the polymer has an affinity for the dispersed core particles, and removing the excess polymer by a solid/liquid separation process.

2. A process for preparing composite particle dispersions according to claim 1 consisting essentially of:

dispersing a plurality of core particles in a first aqueous solution having a pH sufficiently different from the isoelectric point such that the core particle zeta potential is at least +/−20 millivolts, adding an amount of a polymer to the dispersion of core particles, the polymer having a potential opposite that of the dispersed core particles, and removing excess polymer by a) centrifuging the solution, thereby forming a supernatant solution which comprises non-adsorbed excess polymer and a residual solution containing polymer-coated core particles, b) removing the supernatant solution, c) re-dispersing the residual solution in a pure aqueous solution, and d) repeating steps a) through c) as necessary until the excess polymer in the supernatant solution is substantially eliminated.

3. A process for preparing composite particle dispersions according to claim 2, wherein the core particles have an average diameter between 0.1 and 1.0 μm.

4. A process for preparing composite particle dispersions according to claim 3, wherein steps a) through c) are repeated as necessary until the excess polymer concentration in the supernatant solution is less than 1 ppm.

5. A process for preparing composite particle dispersions according to claim 4, wherein the core particle zeta potential is at least +/−40 millivolts.

6. A process for preparing composite particle dispersions according to claim 5, wherein the amount of polymer added is the minimum necessary amount to produce polymer-coated core particles having the maximum polymer adsorption density.

7. A process for preparing composite particle dispersions comprising:

dispersing a plurality of core particles in a first aqueous solution wherein the core particles do not irreversibly self-flocculate, the first solution having a pH sufficiently different from the isoelectric point such that the core particle zeta potential is at least +/−20 millivolts, adding an amount of polymer to the dispersion of core particles, wherein the polymer has an affinity for the dispersed core particles, the polymer having a potential opposite that of the dispersed core particles, removing the excess polymer by a) centrifuging the solution, thereby forming a supernatant solution which comprises non-adsorbed excess polymer and a residual solution containing polymer-coated core particles, b) removing the supernatant solution, c) re-dispersing the residual solution in a pure aqueous solution, and d) repeating steps a) through c) as necessary until the excess polymer in the supernatant solution is substantially eliminated, and a suspension of shell particles having a size between 1 and 100 nm dispersed in a second aqueous solution is added to the solution of polymer-coated core particles, and excess shell particles are subsequently removed by a) centrifuging the solution, thereby forming a supernatant solution which comprises non-adsorbed excess shell particles and a residual solution containing shell particle-coated composite particles, b) removing the supernatant solution, c) re-dispersing the residual solution in a pure aqueous solution, and d) repeating steps a) through c) as necessary until the excess shell particles are substantially eliminated.

8. A process for preparing composite particle dispersions according to claim 7, wherein the shell particles have a diameter between 1 and 100 nm.

9. A process for preparing composite particle dispersions according to claim 8, wherein the core and shell particles are selected from the group consisting of metal oxides, metal carbides and metal nitrides.

10. A process for preparing composite particle dispersions according to claim 9, wherein the polymer is selected from the group consisting of polyacrylic acid, polyvinyl alcohol, polyamides and polypeptides.

11. A process for preparing composite particles according to claim 10, wherein the polymer is polyacrylic acid.

12. A process for preparing composite particle dispersions according to claim 11, wherein the polymer has a molecular weight in the range of about 2,000 to about 150,000.

13. A process for preparing composite particle dispersions according to claim 10, wherein the first aqueous solution and the second aqueous solution comprise less than 0.10M of a salt.

14. A process for preparing composite particle dispersions according to claim 2, wherein the polymer has a molecular weight in the range of about 2,000 to about 150,000.

15. A process for preparing composite particle dispersions according to claim 1 consisting essentially of:

dispersing a plurality of core particles having an average diameter between 0.1 and 100 microns in a first aqueous solution having a pH sufficiently different from the isoelectric point such that the core particle zeta potential is at least +/−20 millivolts, adding an amount of a polymer to the dispersion of core particles, the polymer having a chemical affinity for the dispersed core particles, and removing excess polymer by a) centrifuging the solution, thereby forming a supernatant solution which comprises non-adsorbed excess polymer and a residual solution containing polymer-coated core particles, b) removing the supernatant solution, c) re-dispersing the residual solution in a pure aqueous solution, and d) repeating steps a) through c) as necessary until the excess polymer in the supernatant solution is substantially eliminated.

16. A process for preparing composite particle dispersions according to claim 15, wherein the polymer has a molecular weight in the range of about 2,000 to about 150,000.

17. A composite particle dispersion prepared by a process which consisting essentially of:

dispersing a plurality of core particles in a first solution wherein the core particles do not irreversibly self-flocculate, adding an amount of a polymer to the dispersion of core particles wherein the polymer has an affinity for the dispersed core particles, and removing the excess polymer by a solid/liquid separation process.

* * * * *